United States Patent [19]

Blumstein et al.

[11] Patent Number: 5,589,855
[45] Date of Patent: Dec. 31, 1996

[54] VISUALLY IMPAIRED CUSTOMER ACTIVATED TERMINAL METHOD AND SYSTEM

[75] Inventors: Paul Blumstein, Palos Verdes; Randy Cole, Los Angeles; James Cook, Manhattan Beach; Ashwin Doshi, Cerritos; Michael Grandcolas, Santa Monica; Stephen Gryte, Los Angeles; Frank McCallick, Encino; Marvin Moskowitz, West Hills; Howard Schechtman, Agoura Hills; Michael Sears, Torrance; Steve Shulman, West Hollywood, all of Calif.; Walter Greenberg, Chicago, Ill.; Patricia Millo, Port Washington, N.Y.; Paul Sidikman, Livingston, N.J.; Alex J. Virnig, Northridge; Paul Witman, Simi Valley, both of Calif.; Valerie Fenster, New York, N.Y.

[73] Assignee: Transaction Technology, Inc., Santa Monica, Calif.

[21] Appl. No.: 930,319

[22] Filed: Aug. 14, 1992

[51] Int. Cl.$^6$ ........................................... G09G 5/00
[52] U.S. Cl. ..................... 345/173; 235/379; 340/825.19
[58] Field of Search .................................. 345/156, 170, 345/173; 340/825.19, 825.33; 341/21; 235/379, 375; 902/4, 5, 20; 221/2

[56] References Cited

U.S. PATENT DOCUMENTS 5,185,515  2/1993  Nishibe ..................................... 235/379

FOREIGN PATENT DOCUMENTS

0186359  8/1987  Japan.
2145257  3/1985  United Kingdom .............. 340/825.19

*Primary Examiner*—Kee M. Tung
*Assistant Examiner*—Matthew Luu
*Attorney, Agent, or Firm*—Blakely Sokoloff Taylor & Zafman

[57] ABSTRACT

A method and system for entering numerical information in a manner that can be easily used by visually impaired individuals are disclosed. Using a touch screen display, for each digit of a multidigit number a first location on the screen is touched a number of times equal to the digit followed by touching a second location. Once all the digits have been entered, a third location is touched. This method allows for dividing the touch screen display into a small number of large area touch active regions, such as quadrants, thus reducing the accuracy required to enter a value since the large area quadrants are easily referenced to the screen boundaries. Further, audible cues are used to prompt the user as well as provide feedback.

23 Claims, 7 Drawing Sheets

VISUALLY IMPAIRED CUSTOMER ACTIVATED TERMINAL METHOD AND SYSTEM

BACKGROUND OF THE INVENTION

The present invention relates generally to electronic financial transactions and, more particularly, to a financial transaction method and system for visually impaired, blind, and learning disabled individuals.

Customer activated terminals (CATs), or automatic teller machines (ATMs), have become a well established and convenient means for performing typical banking transactions such as deposits, cash withdrawals, and balance monitoring, thus reducing the need for personal teller interaction and concomitantly reducing waiting time for both common transactions performed by the CAT and transactions requiring a personal teller. These automated tellers offer 24 hour accessibility and still offer privacy and security, as well as customer service via a telephone which is usually located adjacent to the ATM.

Although a vast majority of individuals enjoy the convenience and flexibility associated with ATMs, many individual are limited from sharing these attributes due to visual impairment, blindness, or illiteracy disabilities.

There have been many efforts to enable disabled individuals to enjoy the freedom, equal access, and same opportunities that are available to non-disabled individuals both within the banking environment and in other aspects of daily life. Highlighting and abetting these efforts, are laws which mandate changes to improve access and also serve as guidelines for implementing the required changes.

In the banking environment several changes have been made to assist individuals with disabilities. For instance, banking centers employing phones allow individuals to perform nearly all banking using a touch-tone phone, eliminating the need for visual prompts. Hearing impaired individuals requiring use of the ATM phone for customer assistance are aided by a volume control handset. ATMs also have been configured to make them accessible to individuals in wheelchairs.

Despite this progress, further improvements are still needed to allow individuals with disabilities to benefit from the advances in automated banking services. In particular, today's ATMs present the user with small area buttons which are difficult to locate and distinguish for a visually impaired, blind, or learning disabled individual.

SUMMARY OF THE INVENTION

Accordingly, an object of the present invention is to provide a composite method and system for electronic transactions which can be easily used by visually impaired, blind, or learning disabled individuals.

A related object of the present invention is to provide methods and systems which are compatible with existing ATMs, thus facilitating fast, efficient implementation and widespread availability of these options to banking customers.

A further object of the present invention is to provide electronic transaction methods and systems which do not overtly indicate that the user has any disability, thus avoiding the targeting or flagging of the customer which might compromise the individual's safety, security, or self-esteem.

Another object of the present invention is to provide electronic transaction methods and systems which do not rely exclusively on ancillary devices (e.g., telephone connection for control).

In furtherance of these objects, the electronic financial transaction methods and systems of the invention utilize existing ATMs, and particularly ATMs which employ a touch screen display. For every screen that the customer needs to touch, the touch screen display is divided into quadrants, each quadrant representing a large "button" which the user touches to interact with the electronic teller. The quadrant size, being rather large, may be located and touched not only by visually impaired individuals who may be able to discern the large font, high contrast visual cues projected onto each quadrant but also, by learning disabled and blind individuals who may easily orient themselves to the screen (e.g., by locating the screen corners) and thus to the "buttons" thereon. In addition, the electronic teller prompts or responds to user actions with sound cues or "beeps" in a similar way that current ATMs audibly interact with individuals who are not visually impaired. Thus, to one situated away from the user, the sounds are similar to those transmitted during operation in the conventional mode. The visually impaired user may enter the visually impaired person (VIP) mode by simply touching or tapping the upper right quadrant twice in succession, each tap confirmed by a beep and successful transition to the next step confirmed by a "good transition" sound. The user then proceeds through a series of steps which, in the illustrative embodiment, involve either the withdrawal of cash or the deposit of funds. By minimizing the number of steps, using the simple quadrant arrangement and screen tapping signalling scheme, as well as using graphic symbols, large fonts, and high contrast screens, a VIP mode user may easily communicate with the electronic teller and therefore enjoy the same benefits of ATMs as any other individual.

BRIEF DESCRIPTION OF THE DRAWINGS

The invention will be described in greater detail below by way of reference to the accompanying drawings, in which like reference characters refer to like parts throughout the various views, wherein.

DETAILED DESCRIPTION OF THE PREFERRED EMBODIMENT

Figure 1:
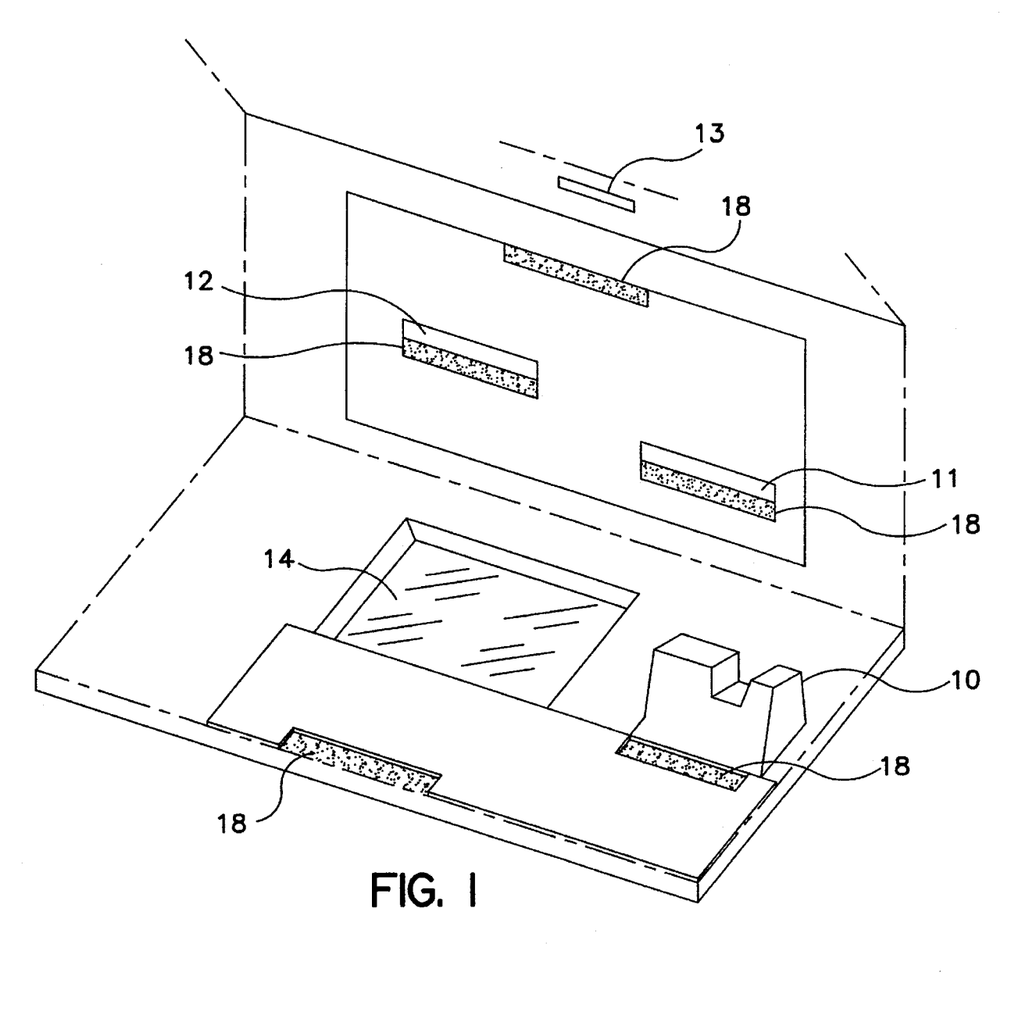
FIG. 1 is a perspective drawing which illustrates an automatic teller machine used in conjunction with the present invention.

The present invention is preferably practiced in conjunction with an automatic teller machine (ATM) which has a touch screen display. FIG. 1 illustrates an ATM with characteristic features such as a card reader 10, a deposit envelope receiver 11, a cash dispenser 12, a record dispenser 13, and a touch screen display 14. The ATM illustrated in FIG. 1 is a widely used type of known construction.

Figure 2:
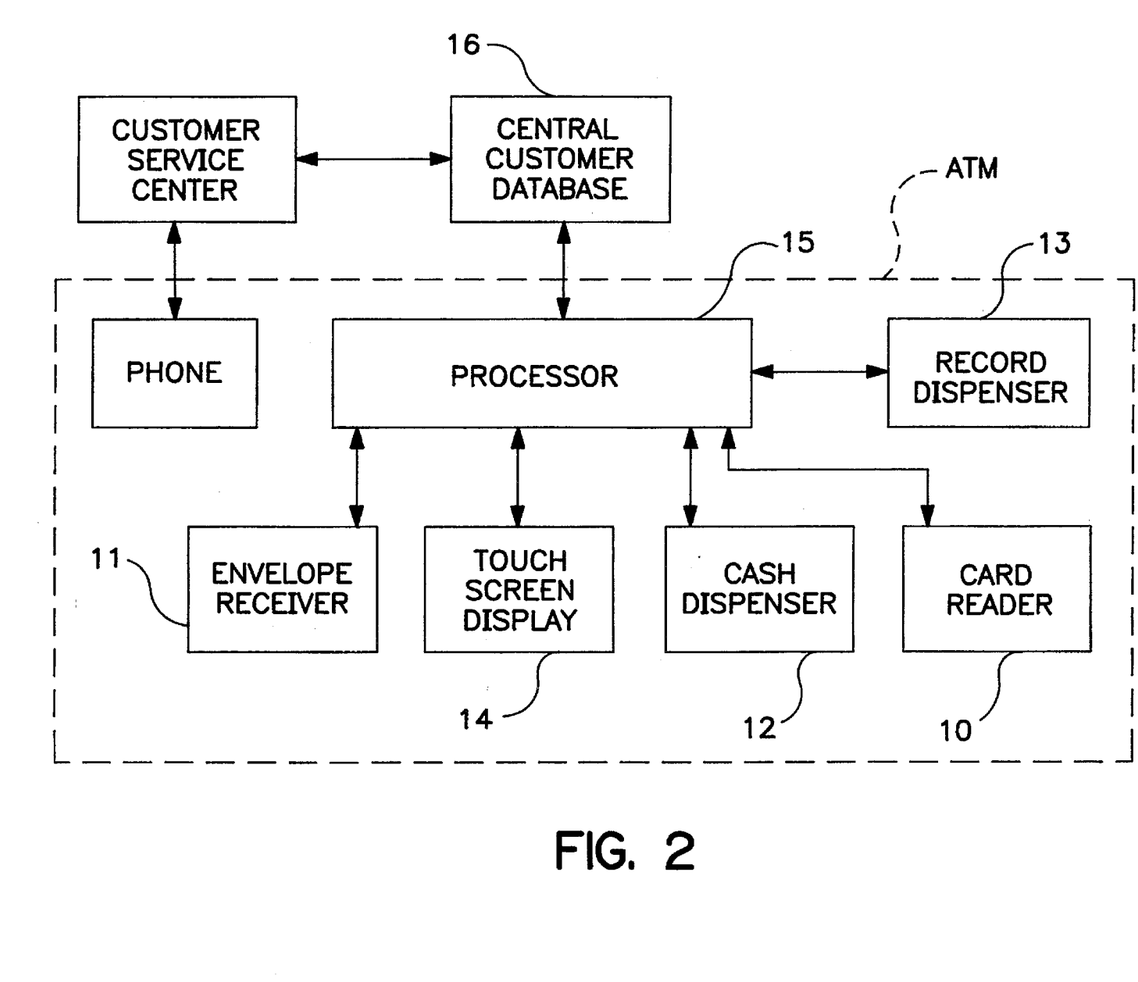
FIG. 2 is a functional block diagram of the components making up the automatic teller machine used in conjunction with the present invention.

FIG. 2 functionally depicts these components communicating with a processor 15 which is also connected to a central customer information data base 16. Processor 15 appropriately receives and/or transmits information and control signals associated with the progression of a series of steps involved in performing a transaction. A preferred feature of the invention is the use of braille labels 18 mounted adjacent to, and identifying, each component. Another component of the preferred embodiment, not shown in the drawings, generates audible cues in the form of sounds of various durations and pitches in response to signals from the processor.

The above components will be discussed below in connection with the description of the data processing and operational steps associated with electronic transactions performed using the ATM. As set forth in the flow charts of FIGS. 3–7, rectangular shapes represent the graphic/textual screen that is projected onto the touch screen display 14, boxes with rounded corners represent a process, and circles represent a connector between steps. Whereas these figures depict numerous steps which represent the overall process, only five basic steps are apparent to the user interface, namely: entering the VIP mode, dipping a credit or debit card, entering a personal identification number (PIN), selecting a transaction type, and entering a numerical value representing the monetary value associated with the selected transaction.

For simplicity in describing the salient aspects of the invention, the operational steps will be described using an ATM possessing a "dipper" type card reader 10 which allows the user, while maintaining a continuous grip, to insert the card into the reader and remove it in one motion (i.e., dip). This type of reader differs somewhat from a transport type reader which removes the card from the customers possession, generally keeping the card for the duration of the transaction but is equally applicable to the present invention. Implementing the invention with transport type card readers is within the routine know-how of one skilled in the art, and thus is not essential to describing the present invention.

In accordance with the preferred embodiment of the present invention, all touch responsive screens presented on the touch screen display 14 are divided into four zones or quadrants which abut each other with no nonresponsive space between them. Except for a small border the four zones encompass the entire display. Thus, once a customer is oriented with respect to the touch screen display 14 (e.g., by locating the corners along the edges) it is relatively easy to touch the proper "buttons" represented by the quadrants. Of course, certain screens may not require that all four zones are active.

As a means of assisting screen orientation, a narrow width of the entire display periphery is responsive to touch but is not associated with any of the quadrants. Instead, it forms a separate border region which in response to touch generates a "normal boop" sound, indicating that the user has touched an undefined zone. This "dead zone" and its associated audio cue allow the user to locate the screen boundary without unintentionally touching one of the active quadrants. As a further aid for the disabled user, graphic and/or textual information displayed as screens on the touch screen display 14 are defined by large fonts, high contrast features, and simple graphics. Furthermore, a distinct set of sound cues provide audible feedback corresponding to: successful completion of a step and progression to another step requiring a user action or input (i.e., "good transition" sounds #1, #2, #3, and #4); unsuccessful completion of a step (i.e., "bad transition" sound); and successful transaction session completion (i.e., "good bye" sound).

Figure 3:
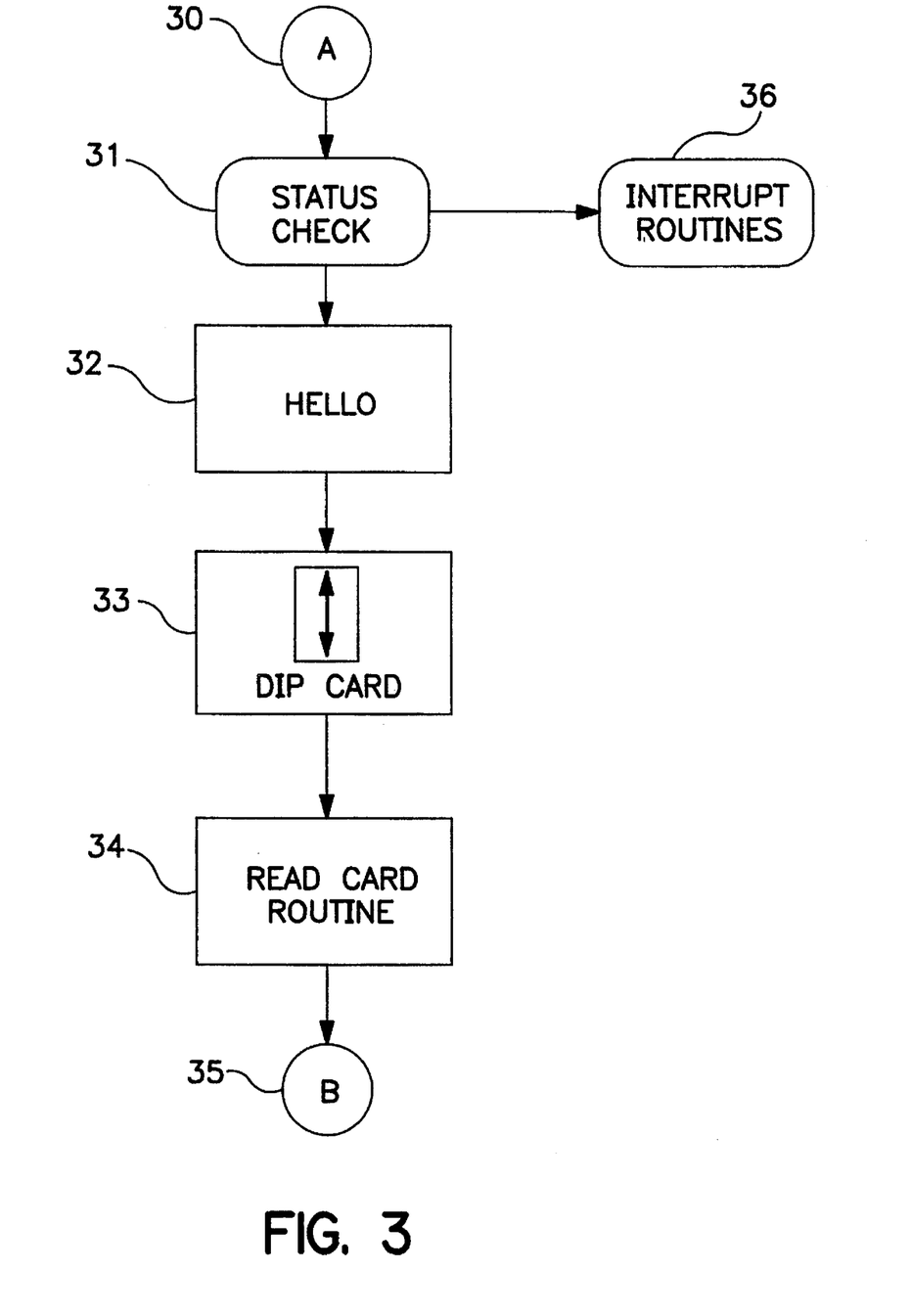
FIGS. 3–6 are operational flow diagrams in accordance with the method of the present invention.

Referring now to FIG. 3, an initial step 31 involves the processor 15 checking the status of all components involved in the operation of the ATM including the record dispenser 13, the card reader 10, the deposit envelope receiver 11, the cash dispenser 12, the touch screen display 14, and the communications link between the processor and the customer data base 16. A status register in the processor 15 is used to store the status bits which are set according to signals received from the respective components. If any component is not operational, then, in step 36, an interrupt handling sequence occurs and the VIP mode will not be available until the condition is corrected. If all components are operational (i.e., "up") then, in step 32, the "HELLO" screen is displayed on the touch screen display 14.

In step 32, the system waits to receive a predetermined number of taps, (e.g., two taps) in the upper right quadrant of the touch screen display 14 and if received initiates the visually impaired person (VIP) mode of operation. A "normal beep" sound occurs for each tap which indicates to the user that the VIP mode has been activated and a "good transition" sound #1 signals that the next step 33 has been entered. Tapping the screen in any location other than the upper right quadrant, in step 32, generates a "normal boop" sound, indicating contact with an invalid zone; the "HELLO" screen remains active until either the VIP mode or the conventional mode is entered. The conventional mode is initiated by dipping a card into the card reader without first tapping the upper right quadrant twice. Having entered the VIP mode in step 32, the routines of step 33 are initiated. A "DIP CARD" display prompts the user to dip a bank card into the card reader 10. Step 34, which is associated with the display of step 33, invokes procedures for monitoring the bank card dipping sequence.

Figure 6:
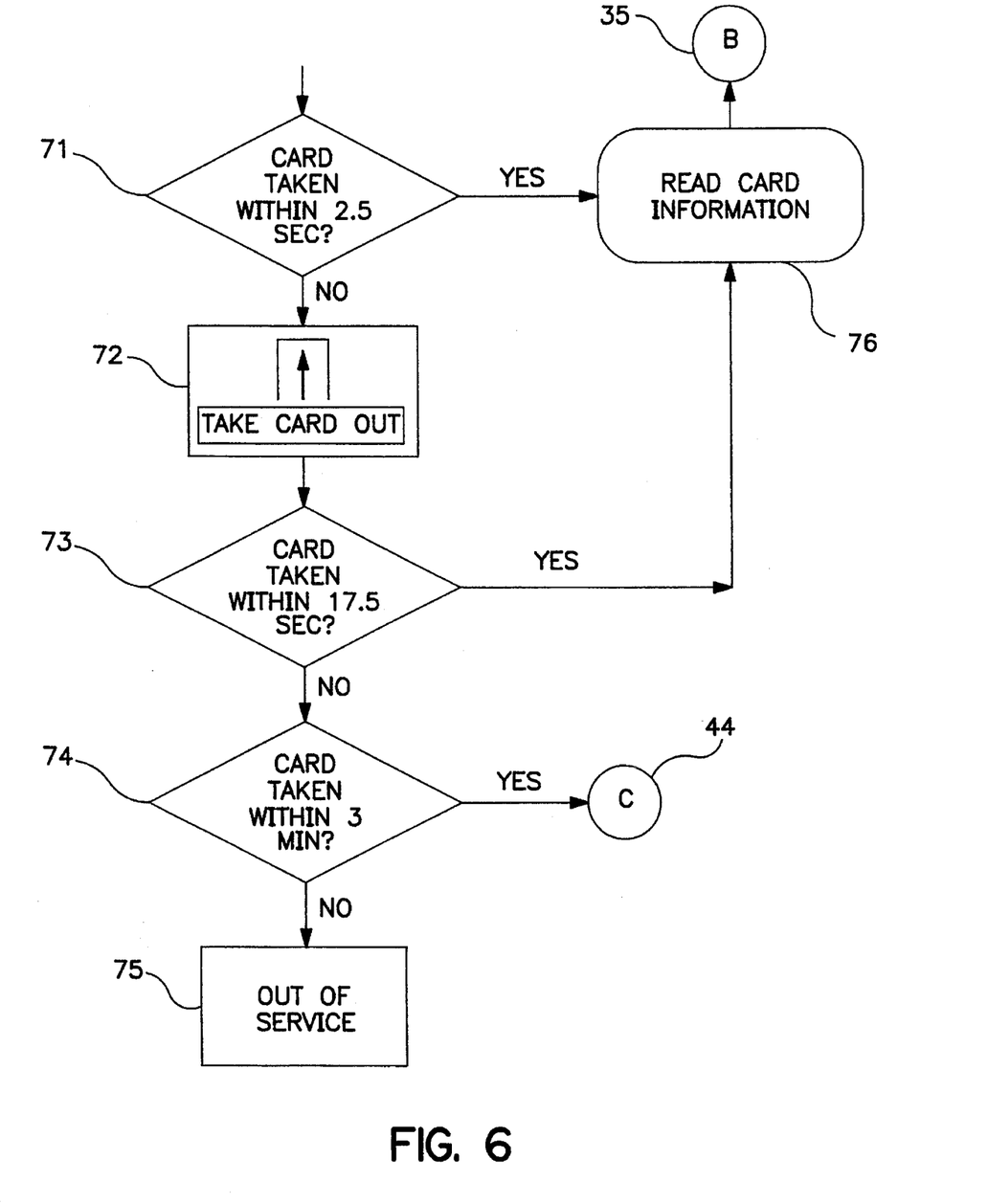

FIG. 6 illustrates the process and flow control of the card reading routine of step 34. Preferably, when a card is inserted into the card reader 10 a first timer of about 2.5 seconds is enabled and if the card is removed within this time (step 71) the processor 15 determines at step 76 whether the information read from the card is valid and returns a signal indicative thereof to the main process flow of FIG. 4 (step 40) via connector 35. Alternatively, if this first timer expires, a "TAKE CARD OUT" screen is displayed, an intermittent "normal bell" sound is generated, indicating that the card should be removed, and a second timer of about 17.5 seconds is started (step 72). The "normal bell" sound is repeated during the 17.5 seconds. If the card is removed within the second timer interval (step 73) then the process progresses to step 76. If, however, the card remains in the card reader after the second timer expires, a third timer of about 3 minutes is started at step 74, and it is determined whether the card is removed within this time period. Failure to remove the bank card within this approximately 3 minute period results in displaying an "OUT OF SERVICE" screen in step 75. In this condition, the ATM is down and the touch screen display 14 is nonresponsive until the card is removed. Removal of the card within this time period causes the process flow to branch to step 45 of FIG. 4 as illustrated by connector 44.

Figure 4:
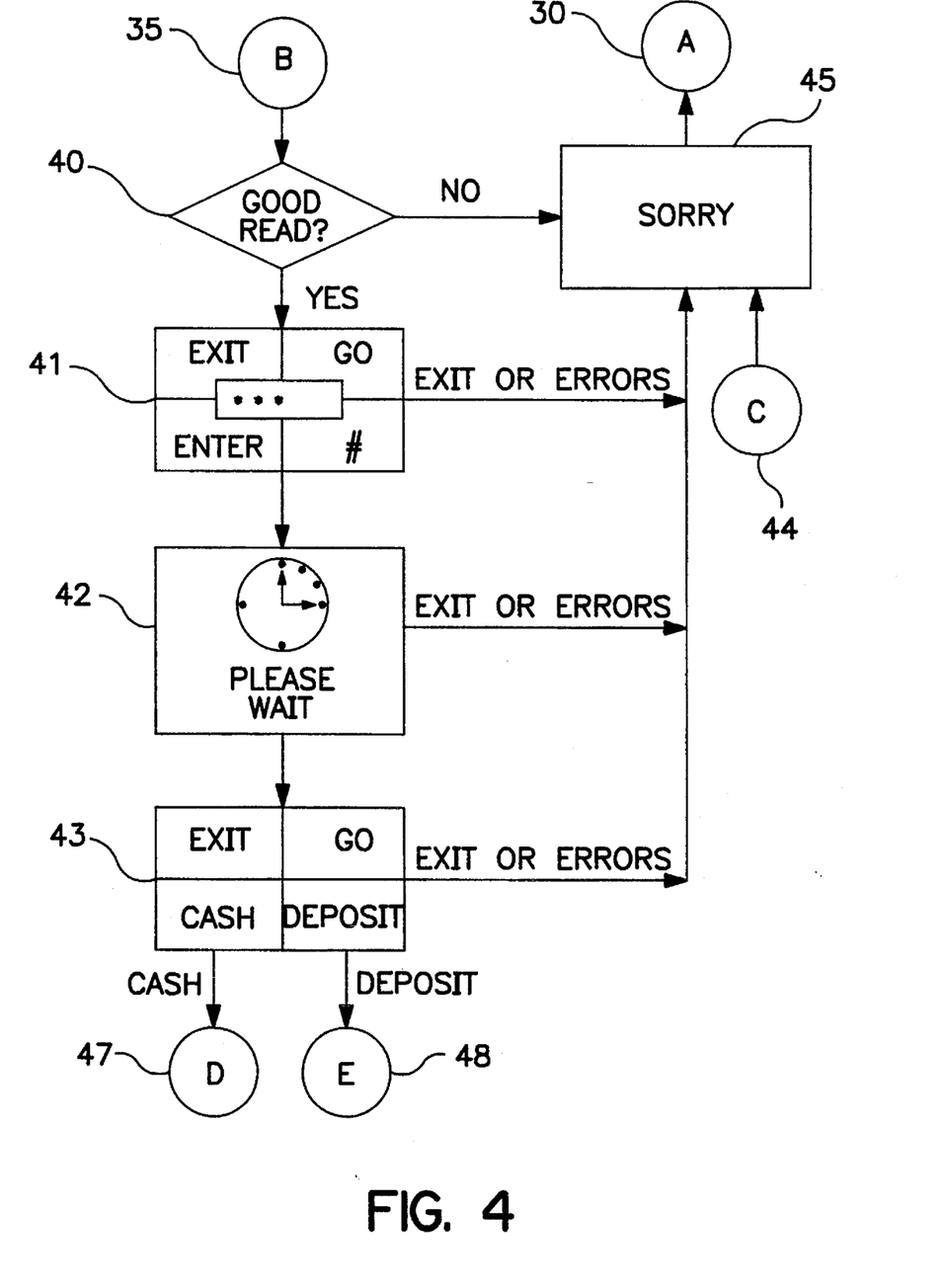

Upon branching to step 45 the ATM presents a "bad transition" sound and displays a "SORRY" screen for several seconds, indicating that an error has prevented a successful transition to the next screen and that the transaction session is aborted. This step is followed by restarting the operational flow in step 31 of FIG. 3 as illustrated by connector 30 which corresponds to the similarly labeled connector in FIG. 3. While the "SORRY" screen is displayed (step 45) the touch screen display quadrants are inactive (i.e., nonresponsive to touch). This reinitialization sequence occurs for all errors throughout the operational flow of the present embodiment.

Returning now to the main flow illustrated in FIG. 3, the described card reading routine of step 34 will either result in the "OUT OF SERVICE" condition of step 75 (FIG. 6), or return a "bad read" output or a "good read" output to step 40 (FIG. 4) by connector 35. A "bad read" output activates the reinitialization sequence (step 45). In the event of a "good read," the system progresses from step 40 to step 41 in which a screen for entering a personal identification number (PIN) is displayed and "good transition" sound #2 is presented. Preferably, as a further aid in progressing through the transaction steps, all "good transition" sounds have the same fundamental sound pattern as the first such sound but each is a multiple of the first in pitch, and/or number of times repeated, and/or tempo.

Figure 7:
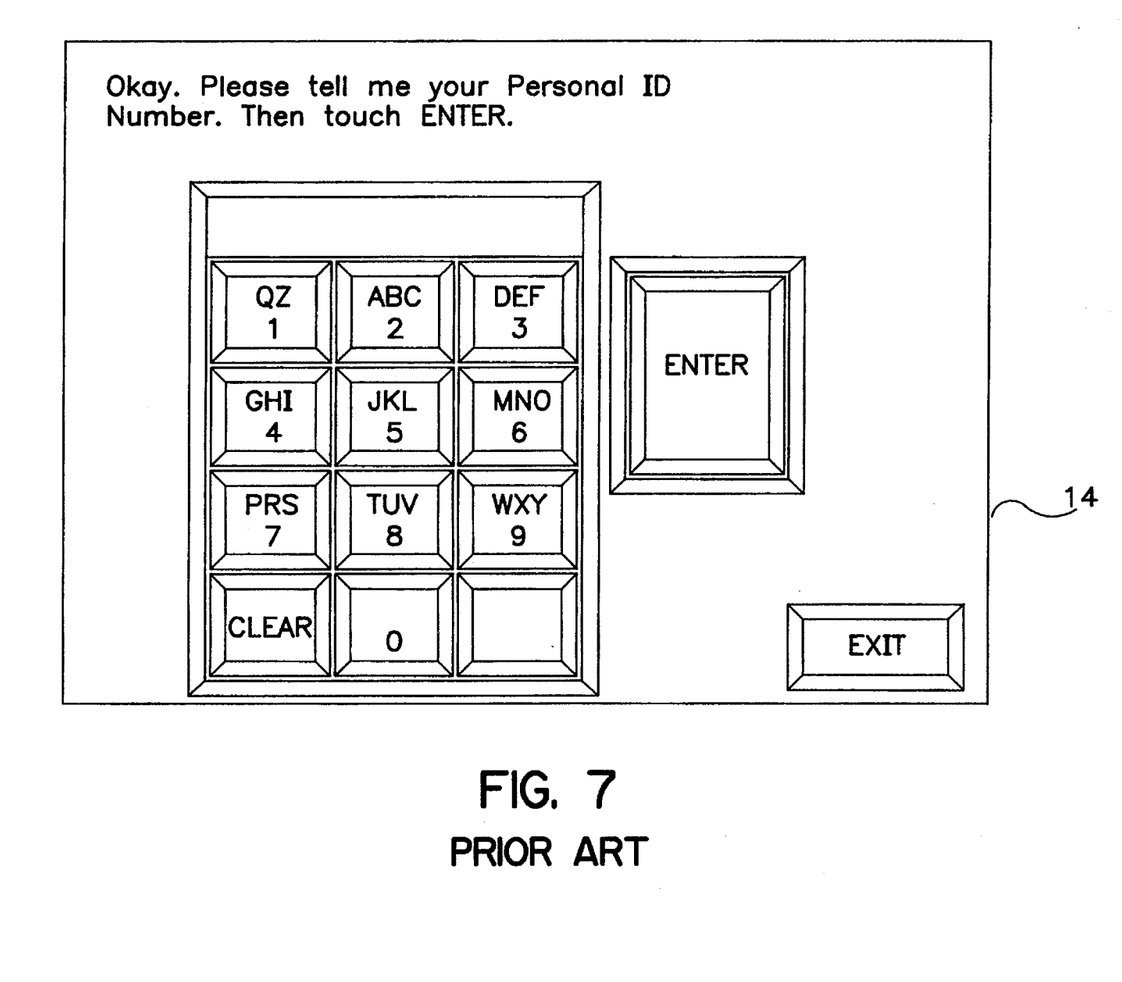
FIG. 7 illustrates a typical touch screen display screen for entering numerical information according to the prior art methods.

In a typical prior art display, a graphic/textual screen such as that shown in FIG. 7 is projected onto the touch screen display for entering numerical information, such as the PIN. This is done by touching the appropriate zone for each numerical value followed by touching the "Enter" zone. For a visually impaired individual this prior art display has an excessive number of limited area touch zones. In fact, for a visually impaired individual such a display is generally more difficult to operate than displays which employ mechanical touch switches, since the mechanical switches allows for orientation by touch without causing a switch to be activated, whereas not only is it challenging to orient oneself to the projected screen of FIG. 7 without inadvertently touching one of the active "buttons" but also, once oriented it is still difficult to touch the desired "button" region.

In contrast, the screen display depicted in step 41 for entering a multidigit PIN number according to the present invention is well suited for use by a visually impaired individual. The quadrants are respectively labeled as "Exit," "Go," "Enter," and "#" (i.e., the number sign), and a central rectangular field (known in this step as the PIN field) symmetrically overlaps a portion of each active quadrant which still abut each other below the PIN field. For each digit of the multidigit PIN the customer taps the lower right "#" quadrant a number of times equal to the digit and then touches the lower left "ENTER" quadrant in order to enter the corresponding digit and delimit it from any succeeding digit which is similarly entered. For instance, entering the number 3 consists of tapping the lower right "#" quadrant three times followed by touching the lower left "ENTER" quadrant once. Consistent with this method, entering a zero consists of solely touching the "ENTER" quadrant without first touching the "#" (i.e., zero taps in lower right; once in lower left to enter digit).

A "normal beep" sound is generated at a lower volume for each tap at both the lower left and lower right quadrants. For each digit entered, an asterisk is displayed to the right of any preceding asterisk within the PIN field. If, for any reason, the customer wishes to abort the transaction session, then touching the upper left "EXIT" quadrant, confirmed by a "normal beep" sound, ends the session and reinitiates the transaction process flow at step 30 via step 45, as previously described. This reinitialization procedure also occurs if the user touches the lower right quadrant greater than nine times for any single digit or attempts entering more than the maximum allowable number of PIN digits.

After entering all the digits of the PIN by this method, the customer indicates completion of this step by touching the upper right "Go" quadrant, the touch being confirmed by a normal beep sound. The reinitialization steps 45 and 30 are performed if fewer than the minimum allowable number of PIN digits were entered; otherwise, if the PIN were correctly entered progression to step 42 is made in which the processor 15 communicates with the central customer database 16 to determine the validity of the PIN. During this time, a "PLEASE WAIT" screen is displayed which is nonresponsive to touch, and a "tick-tock" sound is generated indicating that the ATM is processing and that the user should wait for an additional prompt.

Once the processing is complete, an invalid PIN results in the reinitialization procedure: presenting a "SORRY" screen and a "bad transition" sound (step 45) followed by restarting the flow sequence (step 30). A valid PIN results in the ATM generating the "good transition" sound #3 upon progressing to step 43 in which the user may select a transaction. Using the screen schematically depicted in step 43, the customer may choose either a cash withdrawal or a fund deposit by touching either the lower left "CASH" quadrant or the lower right "DEPOSIT" quadrant, respectively. On either of these two quadrants, one touch presents a "normal beep" sound while any combination of two touches (i.e., two touches of the "CASH" quadrant, two touches of the "DEPOSIT" quadrant, or one touch each of the "CASH" and the "DEPOSIT" quadrants) presents a "normal boop" sound at the occurrence of the second touch which is followed by the reinitialization procedure.

Touching the "GO" quadrant after a proper selection confirms that transaction selection and presents a "normal beep" sound. If "GO" were touched without selecting a transaction, the flow branches to the reinitialization procedure. Touching the "EXIT" quadrant is also confirmed by a "normal beep" sound and is followed by the reinitialization procedure which includes the "bad transition" sound and the "SORRY" screen followed by restarting the process flow (step 30).

If "CASH" were selected successfully in step 43 (FIG. 4) "good transition" sound #4 is presented and the process flow branches to step 51 (FIG. 5) in which the customer enters the desired quantity for the cash withdrawal using a screen such as that depicted in step 51. Using the same procedure as described above for the PIN number entry, the customer enters the desired cash withdrawal amount. Thus, for each digit of the desired amount the customer touches the lower right quadrant, in this case labeled by "$" (i.e., dollar sign), a number of times equal to the digit, followed by touching the lower left "ENTER" quadrant to enter the digit. As they are entered, digits are displayed in the central rectangular field of the screen. Touching the upper right "GO" quadrant, confirmed by a "normal beep" sound, indicates the conclusion of entering the cash value. Typically, the cash withdrawal request must be a multiple of ten (e.g., $10, $20, etc.), and entering an invalid quantity causes branching to the reinitialization procedure, as does any other error, or touching the upper left "EXIT" quadrant.

Figure 5:
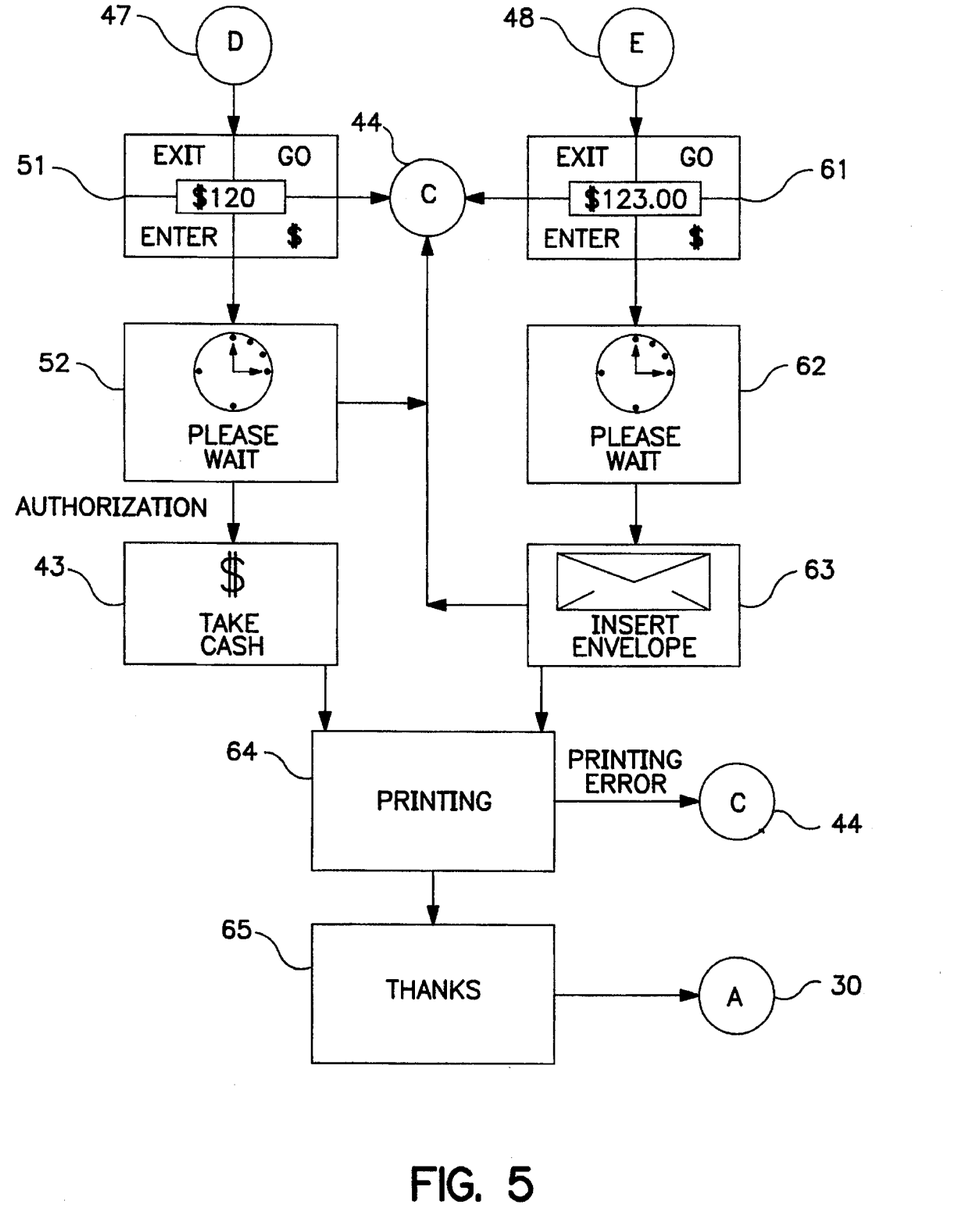

A proper cash value request causes progression to step 52 in which the processor 15 determines whether the transaction is authorized according to the information available from the central customer database 16. During this processing, the previously described "PLEASE WAIT" screen and associated "tick-tock" sound are presented to the customer. Refused authorization results in the reinitialization routine, defined by step 45 followed by step 30. Authorization results in displaying the "TAKE CASH" screen and presenting the cash at cash dispenser 12 until the customer removes the cash or a predetermined maximum time period expires (step 53). If the user does not remove the cash from the cash dispenser 12 within this allotted time period the ATM retracts the dispensed cash. Preferably, cash is dispensed in a single denomination. Upon retraction of the cash by the ATM or retrieval of the cash by the customer, the process flow proceeds to step 64 in order to print a transaction record.

If "DEPOSIT" were selected successfully in step 43, "good transition" sound #4 is presented and the process flow branches to step 56 in which the customer enters the quantity of the deposited funds using essentially the same screen and method used for the cash withdrawal process. Depositing funds, however, must allow for entering cents values and thus, the last two digits entered by the customer always represent cents. For example, to deposit $123 the customer enters each digit in the sequence "12300" from left to right with the decimal implied. Any errors associated with entering the deposited value result in the reinitialization sequence. Properly entering the deposited value and touching the "GO" quadrant in step 61 progresses the process flow to step 62. During the "PLEASE WAIT" screen display and associated "tick-tock" sound (step 62), the processor links to the central customer data base 16 and upon connection proceeds to step 63 in which a display prompts the customer to insert an envelope into deposit envelope receiver 11. If an envelope is not detected, then the reinitialization routine occurs via connector 55, whereas detection of an envelope advances the process flow to step 64.

In step 64, a transaction record is printed and presented by the record dispenser 13. Any error occurring during the printing step (e.g., printer failure) initiates the reinitialization sequence. Proper execution of the printing step 64 yields a "good bye" sound in transition to step 65 in which a "THANKS" screen is displayed for a short period of time before the process flow branches to the initial step 31 via connector 30, thereby rendering the ATM ready for another transaction session from either a disabled or non-disabled user.

The description of the foregoing illustrative embodiment should not be construed as limiting the scope of the invention, and it will be readily understood by those persons skilled in the art that the present invention is susceptible to many modifications, adaptations, and equivalent implementations without departing from its scope. For example, the illustrated method to enter numerical values may be applied to other systems and applications. Also, while the preferred embodiment is herein described in connection with a touch screen display, the present invention may be practiced with other types of touch responsive interfaces (e.g., interfaces including pushbuttons or other tactile transducers). Further, different methods may be used for indicating completion of a numerical entry; for example, by having a maximum allowable time interval between successive taps for specifying a given digit with delays exceeding this maximum indicating that the next digit will be entered. The process flow may also be modified such that the user enters the desired number of bills for cash withdrawals; for example, for a machine dispensing twenty dollar bills an individual would touch the screen five times to withdraw one hundred dollars. Alternatively, different denominations may be made available by having separate regions of one screen, or separate screens, for specifying the desired number or cash value of each denomination.

These and other changes can be made without departing from the spirit and the scope of the invention and without diminishing its attendant advantages. It is therefore intended that the present invention is not limited to the disclosed embodiment but should be defined in accordance with the claims which follow.

We claim:

1. A method of inputting any multidigit number into a processing machine having a touch responsive interface comprising the steps of:

a) transmitting a signal representing one digit of said number to the processing machine by touching a first location of said touch responsive interface a number of times equal to said digit; and b) transmitting a signal to the processing machine indicating the completion of said inputting of said digit by touching a second location on said touch responsive interface one time, c) repeating steps a) and b) for each digit of said multidigit number: and d) transmitting a signal to the processing machine indicating the completion of said inputting of said multidigit number by touching a third location on said touch responsive interface wherein said first, second and third locations of said touch responsive interface are physically distinct areas of said touch responsive interface and are disposed relative to borders of said touch responsive interface.

2. The method according to claim 1 wherein said number is a plurality of digits each of said digits having a value between 0 and 9, said plurality of digits forming a multidigit value, said method further comprising the steps of:

repeating the steps of claim 1 for each digit of said multidigit value; and transmitting a signal to the processing machine indicating the completion of said inputting of said multidigit number by touching a third location on said touch responsive interface.

3. The method according to claim 1 wherein said processing machine is an automatic teller machine.

4. The method according to claim 1 wherein said processing machine generates sounds in response to said touching of said touch responsive interface.

5. The method according to claim 1 for inputting a number into said processing machine further comprising additional information inputting steps required for completing a process performed by said processing machine, successful transition between said inputting steps being audibly signalled by said processing machine.

6. The method according to claim 1 wherein said touch responsive interface includes a touch screen display.

7. The method according to claim 6 wherein said touch screen display is divided into quadrants, each quadrant being separately responsive to touch.

8. The method of dividing said screen according to claim 7 further comprising a separate touch responsive zone along the periphery of said touch screen display.

9. A method, suitable for use by the visually impaired, of inputting a multidigit number into a processing machine having a touch screen display comprising the steps of:

controlling said screen such that it comprises a limited number of large areas to facilitate access by the visually impaired;

transmitting each digit of said multidigit number to said processing machine by touching a first location on said screen a predetermined number of times representative of each digit of said multidigit number followed by touching a second location on said screen; and transmitting a signal to the processing machine indicating the completion of said inputting of multidigit number by touching a third location on said screen.

10. The method according to claim 9 wherein said processing machine is an automatic teller machine.

11. The method according to claim 9 wherein said predetermined number of times representative of each digit equals the numerical value of said digit.

12. A financial transaction method for using an automated teller machine having a touch screen display comprising the steps of:

initiating a transaction session by touching said touch screen display a predetermined number of times in a predetermined location;

inputting each digit of a multidigit identification code into said automated teller machine by touching a first location on said screen a predetermined number of times representative of said digit of said multidigit identification code, followed by touching said touch screen display a predetermined number of times in a second location;

touching said touch screen display a predetermined number of times in a third predetermined location, indicating completion of said inputting step and initiating transaction selection step;

selecting a transaction type by touching said touch screen display a predetermined number of times in one of a plurality of locations, each of said locations representing one of said transaction types, followed by touching a separate location not encompassed by said plurality of locations; and     entering subsequent multidigit values associated with selected said transaction type according to the touching method described by said inputting step and touching step.

13. The method according to claim 12 wherein said predetermined number of times representative of said digit equals said digit.

14. The method according to claim 12 wherein said touch screen display is arranged such that identical options at different steps correspond to same said predetermined location.

15. The method according to claim 12 wherein said touch screen display is divided into quadrants.

16. The method according to claim 12, wherein said transaction types, selected in said selecting step, include withdrawing cash and depositing funds.

17. An apparatus for administering an operational process flow for data processing comprising:

a) a touch screen display adapted for inputting a multidigit number by touching a first location of said screen a number of times equal to one digit of said number; and     b) a processor, connected to said touch screen display, adapted for receiving said number and controlling said operational process flow;

c) said touch screen display having a second location adapted to transmit a signal to the processing machine indicating the completion of said inputting of said digit by touching said second location:

wherein said first and second locations are touched for each digit of said multidigit number, said first location being touched a number of times equal to each of said digits followed by said second location being touched one time to indicate that the inputting of each of said digits by said touching of first location has been completed: and     d) said touch screen display having a third location adapted to transmit a signal to the processing machine indicating the completion of said inputting of said multidigit number by touching said third location wherein said first, second and third locations of said touch screen display are physically distinct areas of said touch screen display and are disposed relative to borders of said touch screen display.

18. The apparatus according to claim 17 wherein said apparatus is an automatic teller machine.

19. An apparatus for administering an operational process flow for a data processing machine comprising:

a) means for inputting a multidigit number by touching a first location and a second location of said inputting means; and     b) means, connected to said inputting means, for controlling said operational process flow;

wherein said first and second locations are touched for each digit of said multidigit number, said first location being touched a number of times equal to each of said digits followed by said second location being touched one time to indicate that the inputting of each of said digits by said touching of first location has been completed: and     c) said inputting means having a third location adapted to transmit a signal to the processing machine indicating the completion of said inputting of said multidigit number by touching said third location wherein said first, second and third locations of said inputting means are physically distinct areas of said inputting means and are disposed relative to borders of said inputting means.

20. The apparatus according to claim 19 wherein said apparatus is an automatic teller machine.

21. The apparatus according to claim 19 wherein said inputting means includes a touch screen display.

22. A computer based system for performing financial transactions using an automated teller machine comprising:

a touch screen display for displaying a plurality of display screens, each display screen including a plurality of regions, each region being separately responsive to touch for receiving information and generating a signal, the sequence of said display screens being selectively determinable by said touch;

a card reader for reading information stored on a transaction card;

a cash dispensing means for disbursing an amount of cash, said amount being entered via one of said display screens;

a fund deposit means for receiving an amount of funds, said amount being entered via one of said display screens;

a transaction record means for providing, at the conclusion of the transaction session, a record summarizing certain results of said session; and     a processor for receiving signals from said touch screen display and card reader, said processor generating appropriate audible cues and display screens while controlling said cash dispensing means, said fund deposit means, and said transaction record means;

and wherein, numerical information, comprising a sequence of digits, is applied to said touch screen display for each of said digits by touching a first predetermined region a number of times equal to value of one of said digits, followed by touching a second predetermined region signifying completion of the entry of that digit; and wherein the input of said numerical information is indicated by touching a third predetermined region.

23. The apparatus according to claim 22 further comprising braille labels mounted adjacent to said card reader, said cash dispensing means, said fund deposit means, and said transaction record means, for indicating each respective function.

\* \* \* \* \*